United States Patent [19]

Shuster et al.

[11] Patent Number: 4,897,321

[45] Date of Patent: Jan. 30, 1990

[54] CONTROLLED ELECTROCHEMICAL POWER GENERATION

[75] Inventors: Nicholas Shuster, Madison; Joseph A. Neff, Cleveland, both of Ohio

[73] Assignee: Gould Inc., Rolling Meadows, Ill.

[21] Appl. No.: 912,274

[22] Filed: Sep. 29, 1986

[51] Int. Cl.[4] .............................................. H01M 2/38
[52] U.S. Cl. ........................................ 429/51; 429/81; 429/67
[58] Field of Search ....................... 429/51, 50, 52, 63, 429/64, 70, 72, 14, 34, 61, 62

[56] References Cited

U.S. PATENT DOCUMENTS

| | | | |
|---|---|---|---|
| 2,921,111 | 1/1960 | Crowley et al. | 429/64 X |
| 3,498,845 | 3/1970 | Huhta-Koivisto | 429/64 X |
| 3,791,871 | 2/1974 | Rowley | 429/122 X |
| 4,074,021 | 2/1978 | Aronson | 429/51 |
| 4,269,907 | 5/1981 | Momyer et al. | 429/72 X |
| 4,555,454 | 11/1985 | Shuster | 429/51 |
| 4,762,758 | 8/1988 | Shuster et al. | 429/144 |

Primary Examiner—Anthony Skapars
Attorney, Agent, or Firm—Marshall, O'Toole, Gerstein, Murray & Bicknell

[57] ABSTRACT

A system and a method of controlled electrochemical power generation are disclosed. The system includes an electrochemical cell comprising an alkali metal anode, a cathode initially spaced about 10–25 mils from the anode to define a flow channel, an electrolyte comprising an aqueous solution of the hydroxide of the alkali metal and, for example, a separator system adapted for providing a substantially uniform pattern of flow of the electrolyte through the flow channel is utilized in a system and method of controlled power generation. Flow control valves may, for example, be used to control the volumetric flow rate of the electrolyte through the flow channel thereby attaining substantially uniform voltage from the cell.

25 Claims, 6 Drawing Sheets

CONTROLLED ELECTROCHEMICAL POWER GENERATION

BACKGROUND OF THE INVENTION

1. Field of the Invention

This invention relates generally to power generation systems and, more particularly, this invention relates to electrochemical cells and methods for controlling and improving their performance thereof.

2. Description of Related Art

Electrochemical cells utilizing a reactive metal anode, an electrically conductive cathode, and an aqueous electrolyte are well known. Such cells are described in detail in numerous patents and publications, including Rowley U.S. Pat. No. 3,791,871 (Feb. 12, 1974), the disclosure of which is incorporated herein by reference.

The cell disclosed in the Rowley patent typifies prior electrochemical cells and utilizes a metal anode which is highly reactive with water and spaced from a cathode by an electrically insulating film formed on the anode in the presence of water. The anode and the cathode are not in direct electrical contact with each other but are in contact with an aqueous electrolyte during operation of the cell. In addition, circuit connections are made at each electrode for drawing electric power from the cell. In the cell of the Rowley patent, the anode comprises an elemental alkali metal, such as sodium or lithium, and the electrolyte comprises an aqueous solution of sodium hydroxide or lithium hydroxide, respectively, produced by the electrochemical reaction of the anodic metal with water.

In such cells, the hydroxide electrolyte concentration is a control parameter for the rate of reaction of the water of the electrolyte and the anode metal. In the past, the power output from such electrochemical cells has been controlled primarily by adjustments made to the concentration of the electrolyte flowing through the cell, with the electrolyte concentration being controlled to prevent anode melting and/or thermal runaway. Typically, such control is effected by the continuous addition of water to the electrolyte while electric power is simultaneously drawn from the cell. The rate of the water addition is appropriately restricted so as to replace the water reduced in the cell during operation and also to maintain the electrolyte concentration balance. A water inlet rate which will result in satisfactory cell operation may be readily established empirically or calculated by material balance.

Since flooding of such a cell with water can result in thermal runaway and explosion, a critical design consideration in such controlled power generation systems is to limit the maximum rate at which water can enter the cell. However, in some applications, limiting the maximum rate at which water can enter the cell may not be feasible and/or practical.

Furthermore, control of such cells so as to obtain substantially flat voltage profiles is desired because electrical motors are commonly regulated via the regulation of the voltage generated thereby. Therefore, systems and methods by which electrochemical cells can be operated for extended periods of time with substantially flat voltage profiles have been sought.

SUMMARY OF THE INVENTION

It is an object of the invention to overcome one or more of the problems described above.

According to the invention, a controlled power generation system comprises an electrochemical cell including an alkali metal anode, a cathode initially spaced about 10–25 mils from the anode to define a flow channel, an electrolyte comprising an aqueous solution of the hydroxide of the alkali metal and means adapted for providing a substantially uniform pattern of flow of the electrolyte through the flow channel. The system includes means for controlling the volumetric flow rate of the electrolyte through the flow channel to attain a substantially uniform voltage output from the cell.

In addition to the power generation system, the invention comprehends a method of power generation wherein the volumetric flow rate of the electrolyte through the flow channel of the electrochemical cell is controlled so as to attain substantially uniform voltage from the cell.

Other objects and advantages will be apparent to those skilled in the art from the following detailed description taken in conjunction with the drawings and the appended claims.

DETAILED DESCRIPTION OF THE INVENTION

According to the invention, a controlled power generation system and a method of power generation in aqueous/alkali metal electrochemical cells is provided. The invention contemplates a system for power generation having an electrochemical cell with a lithium or other alkali metal anode. The cell typically includes a lithium anode, a cathode spaced about 10–25 mils from the anode to define a flow channel, an electrolyte comprising an aqueous solution of lithium hydroxide and means adapted for providing a substantially uniform pattern of flow of electrolyte through the flow channel.

Lithium is a preferred alkali metal for use as the anodic material because of its high energy density. However, other alkali metals, such as sodium, for example, may be used. The metal of the anode may be present in elemental, compound, alloy, amalgam or mixture form, as desired. Reference herein to the preferred lithium is exemplary only, and the invention is understood to encompass the use of other alkali metals.

An electrochemical reaction occurs at the anode, as is well known, to produce a cation of the anodic metal, and an electron. The anodic cation combines with the negatively charged ionic specie (typically hydroxide ion) in the electrotype to form an aqueous hydroxide reaction product, typically lithium hydroxide (LiOH) in the case of a lithium anode.

Figure 1:
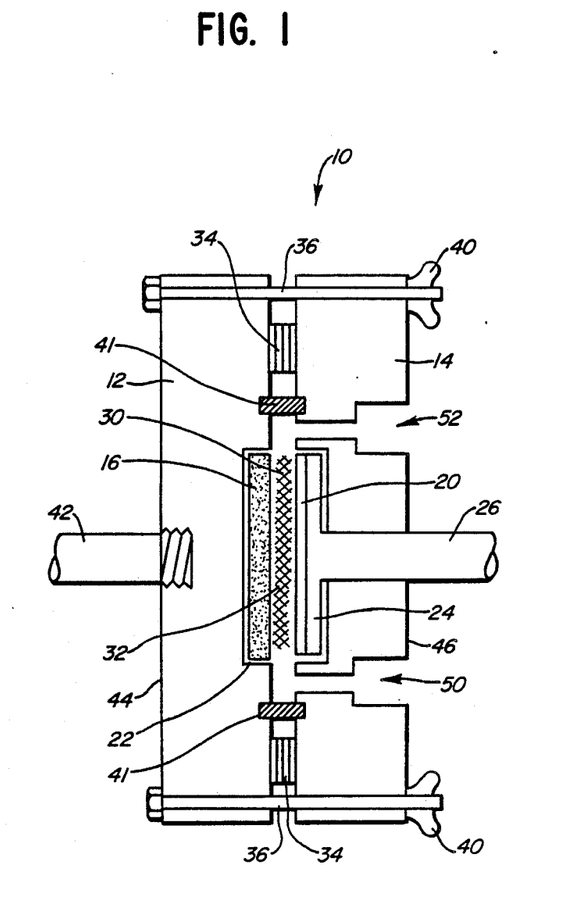
FIG. 1 is a simplified schematic diagram of a laboratory battery according to a typical embodiment of the invention.

Referring to FIG. 1, a simplified schematic diagram of a laboratory battery 10 is shown. The battery 10 consists of two halves 12 and 14 housing a cathode 16 and an anode 20, respectively. The half 12 is generally constructed of metal while the half 14 is made either of "LUCITE" (a trademark of E.I. DuPont de Nemours & Co. for a class of acrylic resins) or "NORYL" (a trademark of General Electric Co. for a class of synthetic thermoplastic resins). "LUCITE" resin is typically used for Li/AgO systems because it is transparent and allows the experimenter to visually follow the cell discharge and, more particularly, the amount of hydrogen gas generated by the cell when the lithium reacts parasitically with the electrolyte in a chemical reaction which produces no electrical energy. Thus, the amount of hydrogen gas generated is a measure of the inefficiency of the battery and the transparent "LUCITE" resin facilitates visual tracking of the extent of this parasitic reaction. "NORYL" resin is used for tests where high operating temperatures may be required.

The metal cell half 12 houses a silver oxide electrode 16 and serves as a heat sink to protect the battery 10 during test conditions which could induce a thermal runaway. The silver oxide electrode 16 is placed into a recess 22 in the metal cell half 12 and is held in place by compression. A lithium anode 20 is pressed onto the negative terminal plate 24 of the negative terminal 26. The anode 20, the terminal plate 24 and the negative terminal 26 are then inserted through the cell half 14.

An inter-electrode flow channel 30 is formed between the cathode 16 and the anode 20. In the practice of the invention, inter-electrode flow channels with initial widths of 10–25 mils are preferred, with initial inter-electrode flow channel widths of 10–20 mils being especially preferred. Such narrow electrolyte flow gaps tend to minimize electrolyte flow rate requirements and IR losses of the cell while maximizing the energy density of the cell.

The inter-electrode flow channel 30 can be filled with any suitable separator 32, adapted to provide a substantially uniform pattern of flow of electrolyte through the flow channel 30. More particularly, the separator 32 may be similar to that of the cell described in detail in Momyer et al, U.S. Pat. No. 4,269,907 (May 26, 1981) or, preferably, in the form of the inter-electrode separator system for electrochemical cells described in Shuster et al, U.S. patent application Ser. No. 808,096 filed Dec. 12, 1985, the respective disclosures of which are incorporated herein by reference.

Although not shown in FIG. 1, the metal cell half 12 is tapped so as to enable warm electrolyte to flow through it. Therefore, prior to the start of a run, electrolyte at the desired test temperature is allowed to flow through the metal cell half 12 to heat the entire battery 10 (including the electrodes 16 and 20) to the desired operating temperature, insuring that all components are at the proper temperature at the beginning of a test run.

The narrow tolerances to which the cell halves 12 and 14 are machined allow the initial width of the flow channel 30 to be precisely set by way of the precision shims 34. The two cell halves 12 and 14 are held together with a pair of tie rods 36 and bolts 40 which allow for easy assembly/disassembly of the laboratory battery 10. Gaskets 41 span the distance between the cell halves 12 and 14 and serve to restrict the electrolyte flow through the battery 10 to the flow channel 30. Electrical connections (not shown) are made at the positive and negative terminal studs 42 and 26, respectively, emanating from the back face 44 and 46 of each cell half 12 and 14, respectively.

By way of the electrolyte inlet 50 and the electrolyte outlet 52 in the cell half 14, electrolyte flows through the flow channel 30 and electric power is generated by the battery 10.

Figure 2:
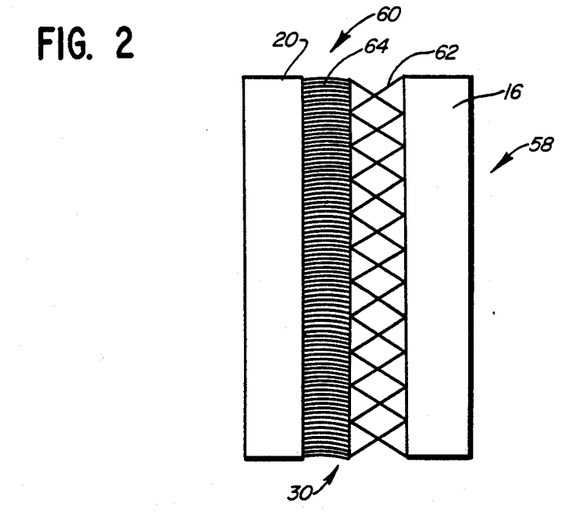
FIG. 2 is a simplified schematic diagram of an electrochemical cell having a preferred inter-electrode separator system for use in the practice of the invention.

FIG. 2 illustrates an electrochemical cell 58 having an inter-electrode separator system 60, as described in the above-identified Shuster et al application, disposed in the flow channel 30. The separator system 60 comprises a rigid, electrically non-conductive porous member 62 disposed adjacent the cathode 16 and a resilient, electrically non-conductive porous member 64 disposed between the anode 20 and the rigid porous member 62 and adjacent the anode 20. More specifically, the rigid porous member 62 may take the form of a rigid screen made of a plastic material such as polypropylene and the resilient porous member 64 may be a compressible reticulated foam material such as a polyether urethane. The inter-electrode separator system of Shuster et al not only promotes uniform turbulent flow of electrolyte between the electrodes, but also assists in reducing cell polarization and consequently permits cell discharge at high power levels.

Figure 3:
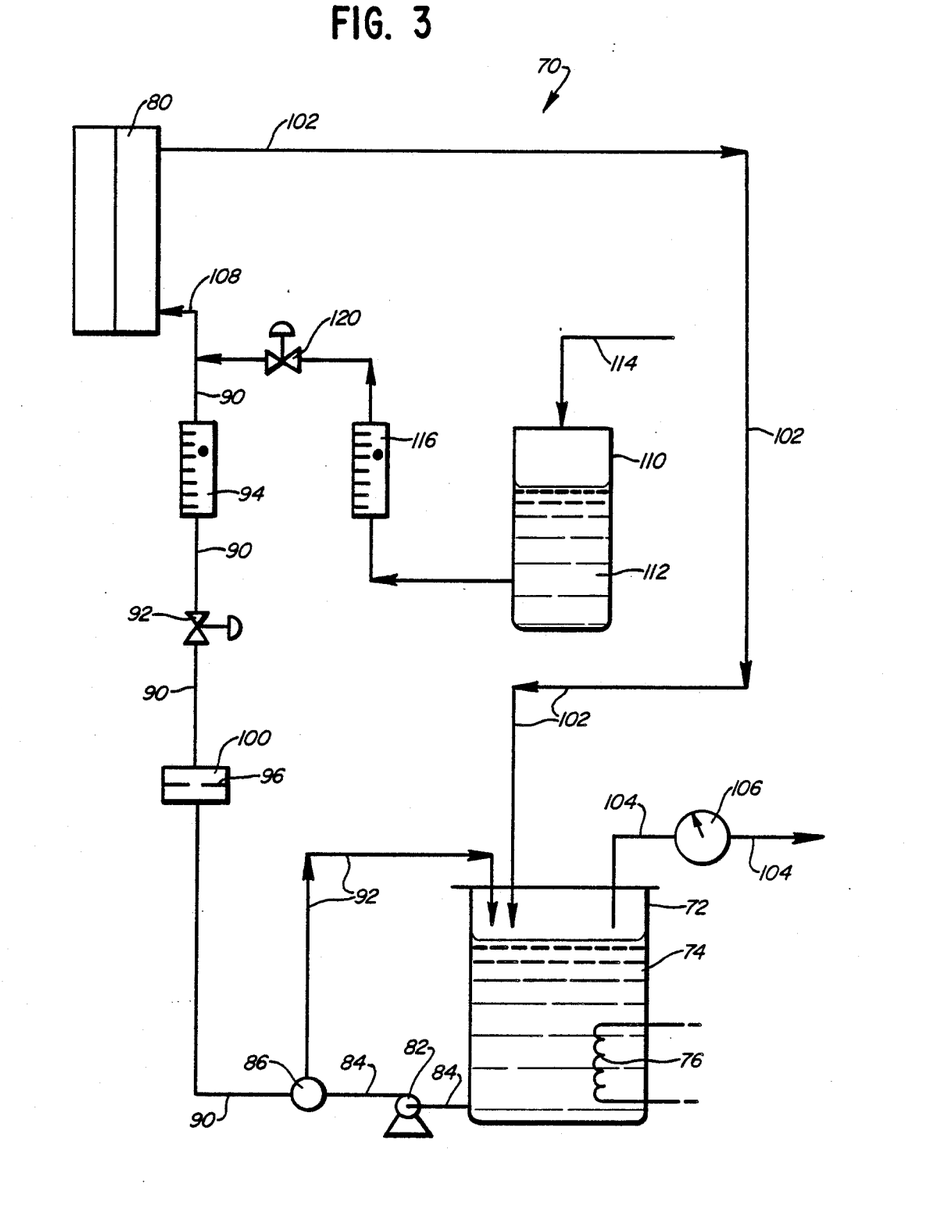
FIG. 3 is a flow diagram of a controlled electrochemical power generation system according to a typical embodiment of the invention.

FIG. 3 illustrates a simplified flow diagram of a controlled electrochemical power generation system 70 as used in a laboratory. A sealed electrolyte reservoir 72 houses approximately one quart of LiOH solution 74, e.g., an amount sufficient in volume that the molarity does not change significantly during the course of the run. (Molarity changes can affect the power output of the battery.) A heater 76 and associated temperature sensing and temperature control elements (not shown) permit regulation of the temperature of the electrolyte 74 contained in the reservoir 72.

The system 70 meters and charts the flow of electrolyte therethrough and into a battery 80. The system 70 includes a pump 82 to pump the electrolyte (designated as a flow stream 84) from the reservoir 72. A three-way flow valve 86 allows an electrolyte stream 90 to flow toward the battery 80 or, alternatively, the formation of a by-pass stream 92 by which electrolyte may be returned to the reservoir 72 rather than continue on toward the battery 80.

The electrolyte flow stream 90 is metered very precisely by way of a precision pneumatic control valve 92. A flow meter 94 provides a visual flow read-out while an orifice plate 96 coupled to a differential pressure transmitter 100 allows for continuous strip chart recording of the electrolyte flow rate.

The electrolyte (designated as a flow stream 102) and having hydrogen gas generated in the battery 80 dispersed therein is returned to the electrolyte reservoir 72. The hydrogen gas (designated as a flow stream 104) is released from the electrolyte and is measured through a wet test meter 106 which is also operatively connected to a strip chart recorder (not shown). The strip chart recorder allows a permanent record of the volume of hydrogen gas generated by the battery 80 and enables the calculation of the amount of lithium chemically consumed and thus serves as a measure of the inefficiency of the process.

A quantity of water diluent can also be added to the electrolyte, prior to the introduction of the electrolyte to the battery, thereby reducing the lithium hydroxide molarity of the electrolyte stream 108 flowing to the battery 80. This also affords control over the power output of the battery. Thus, the system 70 includes a diluent reservoir 110 containing a quantity of a diluent 112, such as seawater. The diluent reservoir 110 is pressurized with nitrogen gas at 25 psi as signified by a stream 114, so as to drive the flow of diluent 112. A flow meter 116 is provided to measure the flow of diluent so as to prevent over dilution of the electrolyte flowing to battery 80. The flow of diluent is precisely adjusted by way of a precision pneumatic control valve 120.

Flow adjustments in the system 70 are easily amenable to automatic control. For example, the control valves, such as control valves 92 and 120, may either be manually adjusted or controlled by automatic controllers, providing the flexibility needed for developing sophisticated automatic control algorithms.

The power output of such electrochemical cells is generally related to temperature, with higher voltages generally resulting from the operation of the cells at higher temperatures. Higher operating temperatures, however, result in higher rates of hydrogen gas production. Thus, an operating temperature of about 45°–50° C. is generally preferred for such batteries.

The system hardware is constructed of any suitable material. For example, all the plumbing may be made of rigid stainless steel, and all of the pumps, valves, and sensors are made of materials compatible with hot lithium hydroxide solution.

Figure 4:
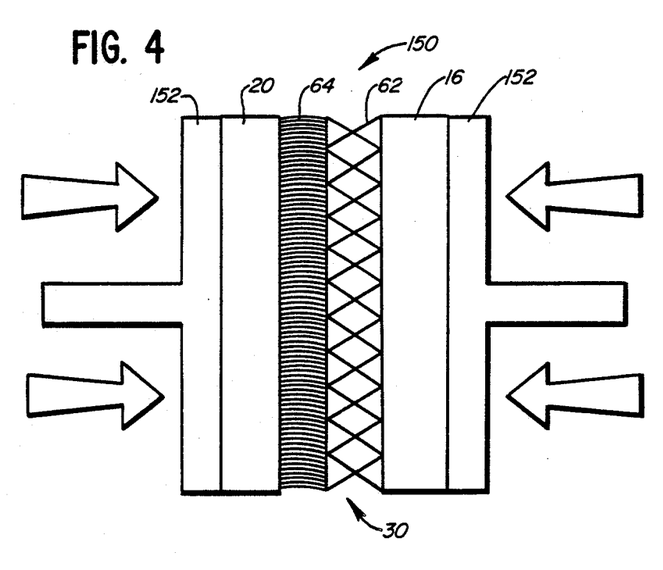
FIG. 4 is a simplified schematic diagram of an alternative embodiment of the invention wherein the width of the inter-electrode flow channel is maintained substantially constant during operation of the cell.

An embodiment of the invention wherein the width of the inter-electrode flow channel is maintained substantially constant during operation of the electrochemical cell may be preferred for some applications because the performance of such a system would be relatively independent of electrolyte molarity control. For example, see FIG. 4 wherein an electrochemical cell 150, similar to the cell 58 of FIG. 2 and including a cathode 16, an anode 20, and a separator system 32 comprising a foam layer 64 and a screen layer 62 is shown. The width of the flow channel 30, formed between the cathode 16 and the anode 20, is maintained substantially constant by means of the compressive forces generated by a compressive force means 152. Such compressive means may, for example, take the form of bellows, springs or other means which would be apparent to those skilled in the art. Without such maintenance, the width of the flow channel 30 would widen during operation of the cell 150 due to consumption of the anode 20 and thereby reduce the effectiveness of electrolyte flow rate as a control parameter.

Figure 5:
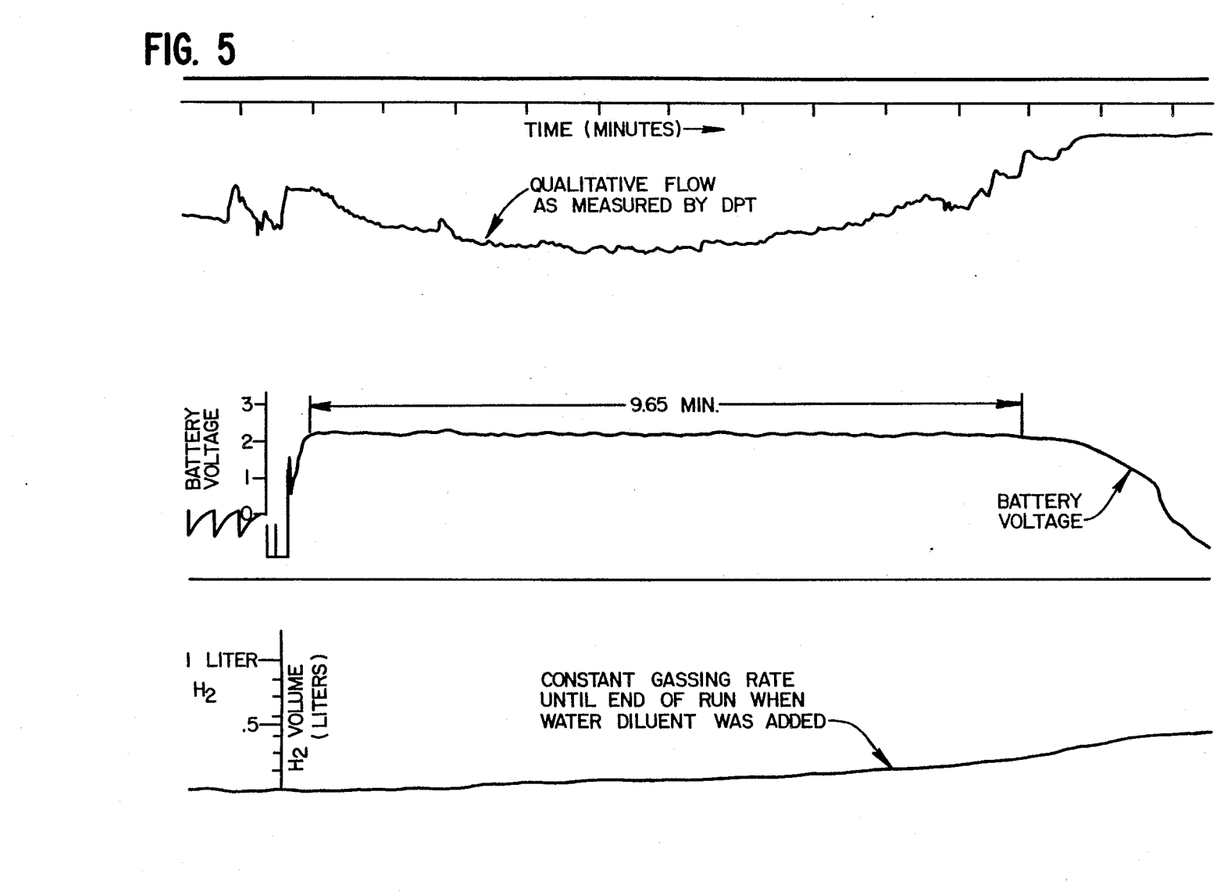
FIGS. 5 and 6 are graphical depictions of electrolyte flow, battery voltage, and hydrogen gas volume versus time for controlled electrochemical power generation according to typical embodiments of the invention.
Figure 6:
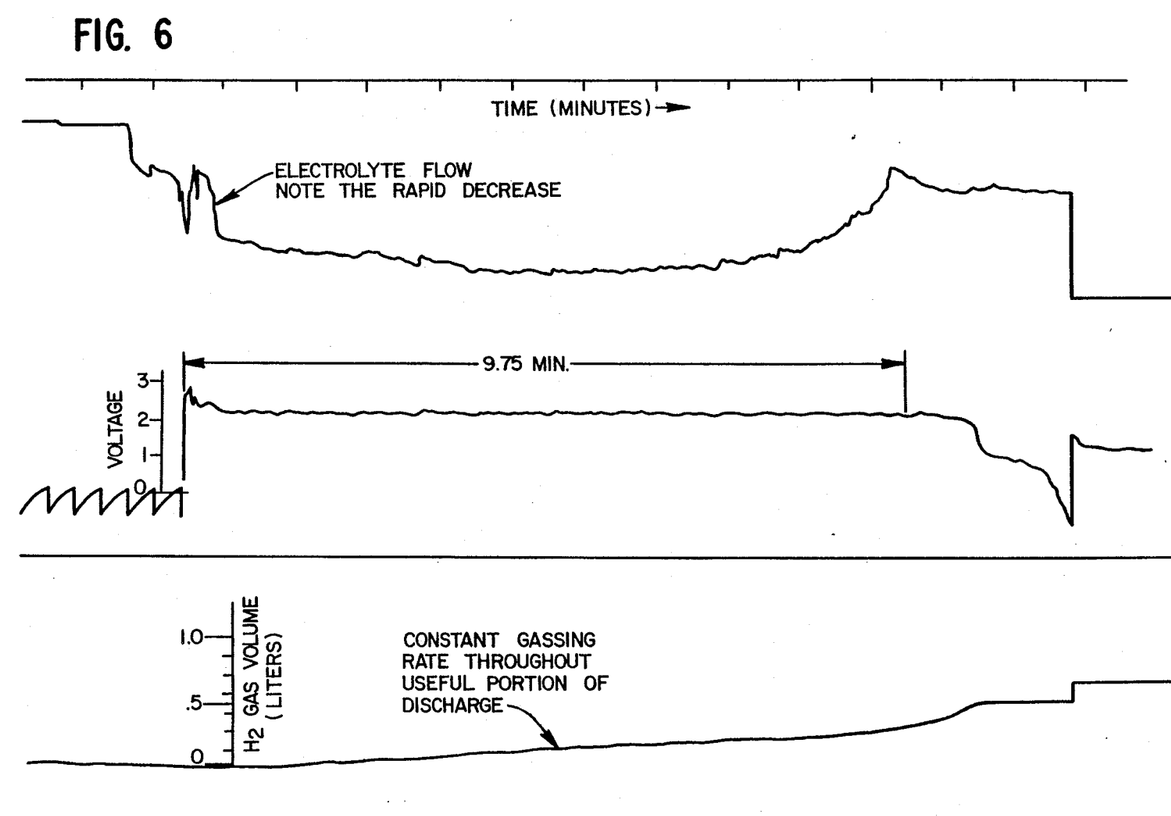

FIGS. 5 and 6 are graphical depictions of electrolyte flow, battery voltage, and hydrogen gas generation volume versus time for controlled electrochemical power generation according to typical embodiments of the invention. For the runs depicted in FIGS. 5 and 6, the flat voltage profiles were maintained by way of electrolyte flow control, with diluent addition being made only at the end of each of the runs, when flow control was no longer effective.

For the runs shown in FIGS. 5 and 6, voltages were maintained at a constant 2.2±0.05 volts for 9.65 minutes and 9.75 minutes, respectively. Thus, electrolyte flow control permits substantially constant voltages to be maintained for significantly longer periods of time as compared to prior methods of power generation control which utilize electrolyte molarity as the primary control parameter.

For the runs shown in FIGS. 5 and 6, a differential pressure transmitter (DPT) was used for measuring electrolyte flow and plots (not calibrated) of electrolyte flow vs. time are presented along with each battery voltage curve. For each run, a comparison of the electrolyte flow curve with battery voltage shows a general one-to-one correspondence between the battery's response and even slight changes in electrolyte flow. Thus, flow adjustment offers the advantage of rapid response since the battery can immediately sense flow changes.

For the runs shown in FIGS. 5 and 6, molarity control of the electrolyte was not required and electrolyte flow control alone was sufficient for virtually the entire run. It was noted that the electrolyte volumetric flow rate, set initially to provide a velocity of 35 cm/sec at an inter-electrode flow channel width of 23 mils, had to be adjusted downward for the first several minutes of each of the runs. It is believed that this is due to significant increases in the effective lithium surface area as morphological changes take place during cell activation and operation.

Further, an inter-electrode separator system comprising a rigid polypropylene screen placed against the silver oxide electrode and a reticulated polyurethane foam layer placed against the lithium anode was used for each of the runs. As described above, the separator, such as the separator system 60 in FIG. 2, is adapted to provide a substantially uniform flow of electrolyte through the cell flow channel 32 of the battery 10.

FIGS. 5 and 6 show that using electrolyte flow rate as a control parameter results in the runs having very reproducible hydrogen gas gassing rates. Further, the hydrogen gassing rates for these runs were lower than those associated with electrochemical power generation systems wherein electrolyte molarity is the prime control parameter. The lower hydrogen gas gassing rates are believed to be primarily a result of having conducted the electrolyte flow rate control runs with LiOH concentrations of 4.3 M. The slopes of the gassing curves show that the gassing rate remained essentially constant throughout the useful portions of the cell discharges.

Increased hydrogen gassing rates were observed at the end of the discharge curves and are believed to be a result of pits in the lithium extending through the thickness of the remaining lithium and "breaking through" to the nickel substrate current collector. Once the nickel substrate is exposed and electrolyte fills the pores therein, a localized short circuit battery comprising the lithium-water couple takes place and, as a result of the cathodic reduction of water at the exposed cathodic surface, increased hydrogen gassing is observed and the overall voltage is detrimentally reduced. Furthermore, as this local reaction proceeds more lithium gets consumed at the base of the pits in the lithium, thereby exposing more lithium surface and accelerating the detrimental effects thereof. Once the breakthrough phenomenon becomes pronounced, even substantial increases in electrolyte flow rate and diluent addition rate (to lower electrolyte molarity) may not be sufficient to prevent reductions in the overall cell voltage.

In summary, the use of electrolyte flow rate as a control parameter provides an effective means for controlling the voltage of electrochemical cells through a single primary control variable effective over the duration of an entire run at moderate electrolyte flow rates.

As a quantitative example, the total gas generated in the run depicted in FIG. 6 was approximately 0.28 liters after 9.6 minutes at 14 amps. From the ideal gas correlation and the stoichiometry of the above-identified parasitic reaction, approximately 0.15 gr of Li were consumed parasitically vs. 0.58 gr of Li consumed electro-chemically. Therefore, of the 0.73 gr of Li consumed, approximately 20% was consumed parasitically and 80% was consumed electro-chemically.

The use of the electrolyte molarity as a mode of control, resulting in a significant portion of the run at molarities greater than 4.3 M, in conjunction with the use of electrolyte flow rate control results in lower hydrogen gassing rates for the battery.

Figure 7:
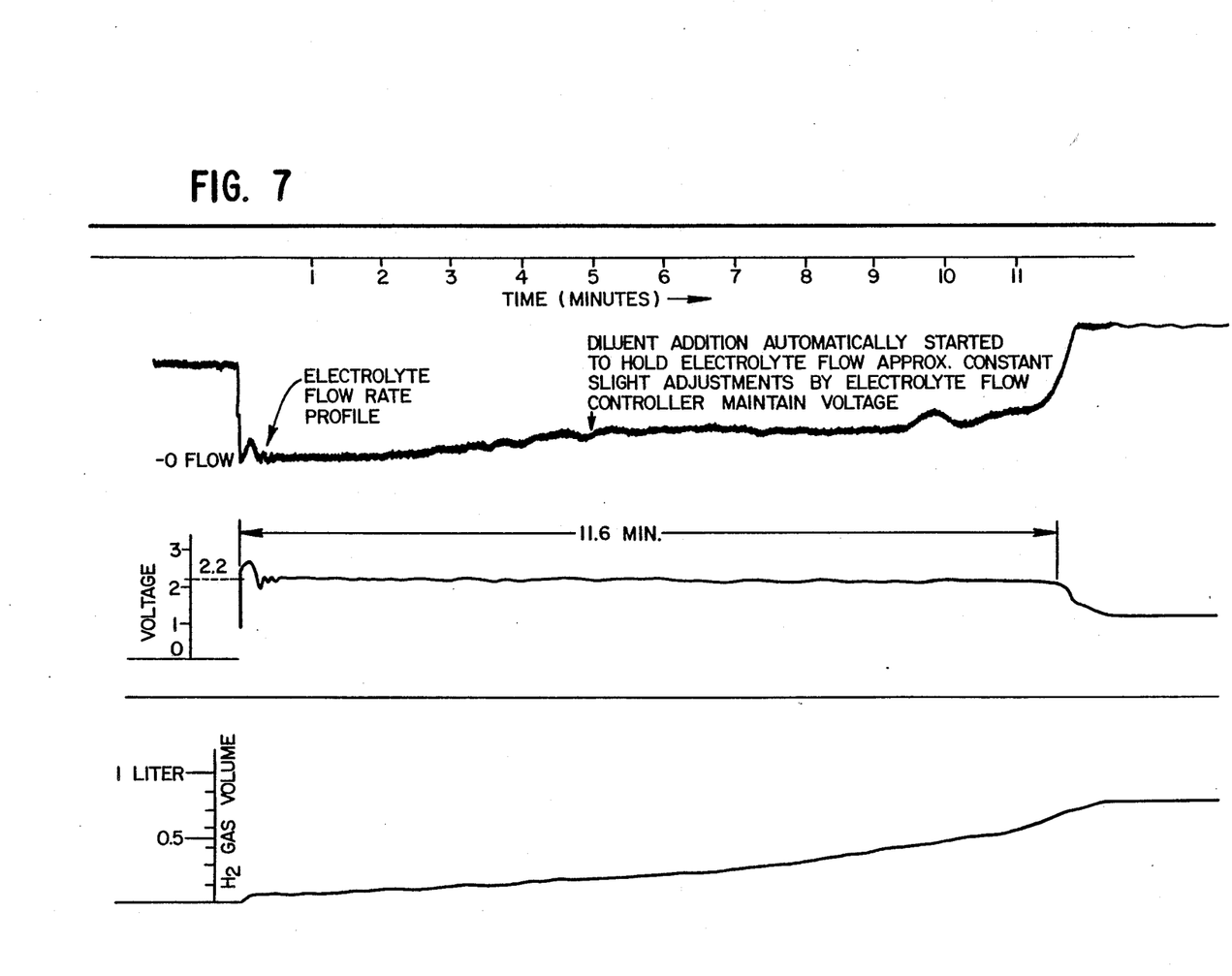
FIG. 7 is a graphical depiction of electrolyte flow, battery voltage, and hydrogen gas volume versus time for an alternative embodiment of the present invention.

FIG. 7 is a graphical depiction of electrolyte flow, battery voltage, and hydrogen gas volume generated versus time for an alternative embodiment of the present invention wherein electrolyte flow control was combined with electrolyte molarity adjustment. Thus, for FIG. 7, a dual loop feedback control system was used wherein the primary control was via electrolyte flow rate and secondary control was via electrolyte molarity adjustment.

As discussed above, electrolyte flow rate control provides fast, continuous and precise control of voltage. The use of electrolyte molarity adjustments in conjunction with electrolyte flow rate control permits the maintenance of flat voltage profiles for extended periods of time as compared to the use of electrolyte flow rate as the sole control parameter, e.g., 11.6 minutes in FIG. 7 vs. 9.65 minutes and 9.75 minutes for FIGS. 5 and 6, respectively.

Further testing with 11 inch diameter batteries has verified that the precise voltage and power control obtained with laboratory cells may be reproduced in full size batteries. Furthermore, the scale up to larger batteries is direct.

The foregoing detailed description is given for clearness of understanding only, and no unnecessary limitations are to be understood therefrom, as modifications within the scope of the invention will be obvious to those skilled in the art.

We claim:

1. A method of power generation, said method comprising the steps of:
   supplying an electrolyte to a flow channel defined between an alkali metal anode and a cathode initially spaced about 10–25 mils from said anode in an electrochemical cell having means adapted for providing a substantially uniform pattern of flow of said electrolyte through said flow channel, said electrolyte comprising an aqueous solution of the hydroxide of said alkali metal; and,
   controlling the volumetric flow rate of said electrolyte through said flow channel in order to attain substantially uniform voltage from said cell.

2. The method of claim 1 wherein said alkali metal comprises lithium.

3. The method of claim 2 wherein said cathode comprises silver oxide.

4. The method of claim 1 wherein said means adapted for providing a substantially uniform pattern of flow comprises a rigid, non-conductive porous member disposed adjacent said cathode and a resilient, nonconductive porous member disposed adjacent said rigid porous member between said rigid porous member and said anode.

5. The method of claim 4 wherein said resilient porous member comprises a compressible reticulated foam material.

6. The method of claim 5 wherein said compressible reticulated foam material comprises polyether urethane.

7. The method of claim 4 wherein said rigid porous member comprises a rigid plastic screen.

8. The method of claim 7 wherein said rigid plastic comprises polypropylene.

9. The method of claim 1 wherein said cathode is initially spaced about 10–20 mils from said anode.

10. The method of claim 1 additionally comprising the step of controlling the molarity of said electrolyte to assist in maintaining said uniform voltage from said cell.

11. The method of claim 10 wherein said step of controlling said molarity of said electrolyte comprises adding diluent to said electrolyte.

12. The method of claim 1 additionally comprising the step of maintaining the spacing of said cathode of said cell from said anode substantially constant during operation.

13. The method of claim 12 wherein said spacing is about 10–20 mils.

14. The method of claim 12 wherein said step of maintaining the spacing of said cathode of said cell from said anode comprises maintaining said cathode and said anode under compression.

15. A method of power generation, said method comprising the steps of:
   supplying an electrolyte to a flow channel defined between an alkali metal anode and a cathode initially spaced about 10–25 mils from said anode in an electrochemical cell having a rigid non-conductive plastic screen member disposed adjacent said cathode and a resilient, non-conductive porous compressible reticulated foam material member disposed adjacent said screen member between said screen member and said anode, said electrolyte comprising an aqueous solution of the hydroxide of said alkali metal; and,
   controlling the volumetric flow rate of said electrolyte through said flow channel in order to attain substantially uniform voltage from said cell.

16. The method of claim 15 wherein said alkali metal comprises lithium.

17. The method of claim 16 wherein said cathode comprises silver oxide.

18. The method of claim 15 wherein said compressible reticulated foam material comprises polyether urethane.

19. The method of claim 15 wherein said rigid plastic comprises polypropylene.

20. The method of claim 15 wherein said cathode is initially spaced about 10–20 mils from said anode.

21. The method of claim 15 additionally comprising the step of controlling the molarity of said electrolyte to assist in maintaining said uniform voltage from said cell.

22. The method of claim 21 wherein said step of controlling said molarity of said electrolyte comprises adding diluent to said electrolyte.

23. The method of claim 15 additionally comprising the step of maintaining the spacing of said cathode of said cell from said anode substantially constant during operation.

24. The method of claim 23 wherein said spacing is about 10–20 mils.

25. The method of claim 23 wherein said step of maintaining the spacing of said cathode of said cell from said anode comprises maintaining said cathode and said anode under compression.

* * * * *

UNITED STATES PATENT AND TRADEMARK OFFICE
CERTIFICATE OF CORRECTION

PATENT NO. : 4,897,321

DATED : January 30, 1990

INVENTOR(S) : Nicholas Shuster, et al.

It is certified that error appears in the above-identified patent and that said Letters Patent is hereby corrected as shown below:

Cover page, First column, following "[73] Assignee:" delete "Gould Inc., Rolling Meadows, Ill." and insert --Westinghouse Electric Corporation, Pittsburgh, Pa.-- in lieu thereof.

Signed and Sealed this

Twelfth Day of March, 1991

*Attest:*

HARRY F. MANBECK, JR.

*Attesting Officer*  *Commissioner of Patents and Trademarks*